June 13, 1933.  R. F. SMITH  1,914,174
FISHING LINE
Filed April 21, 1932   2 Sheets-Sheet 1
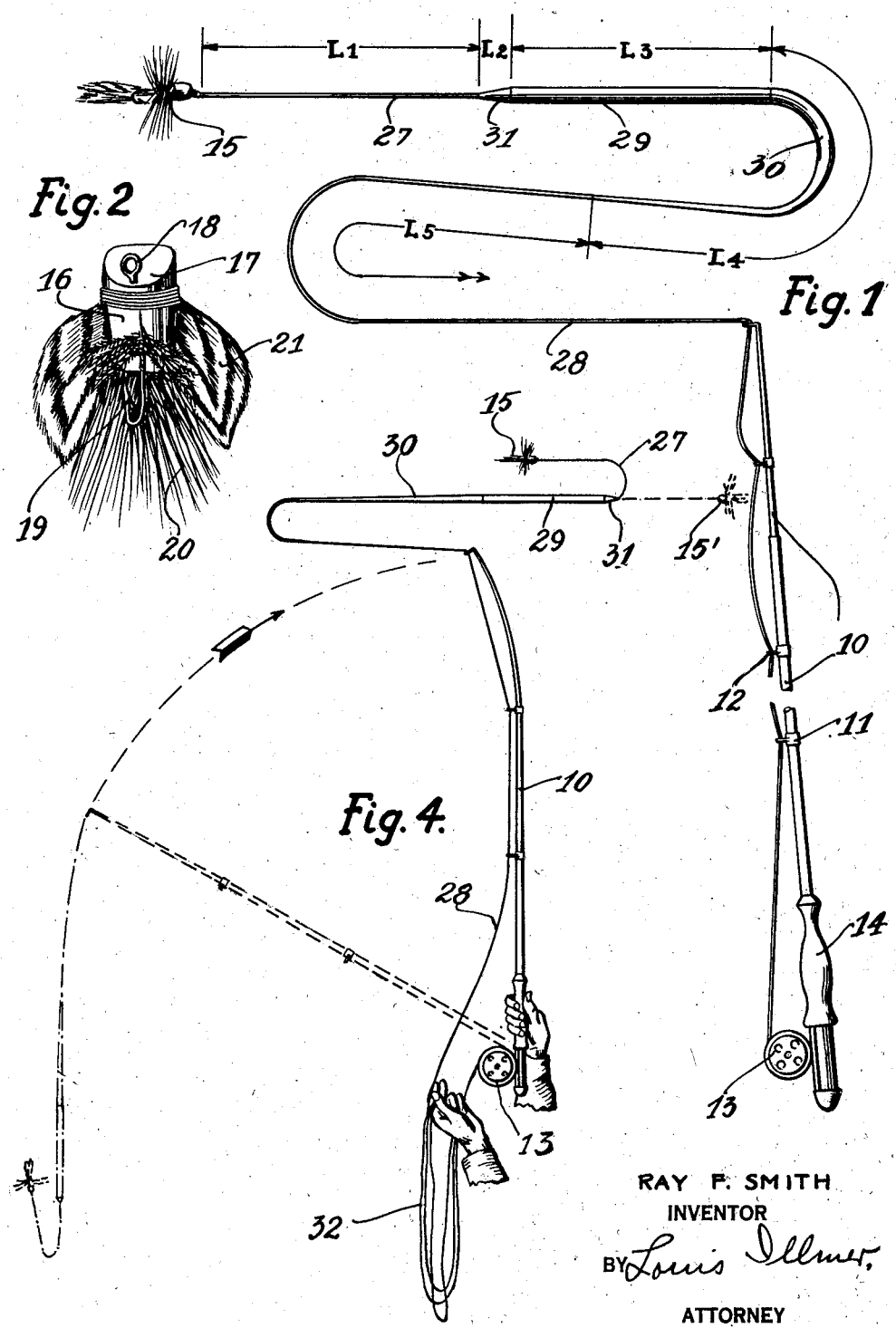
RAY F. SMITH
INVENTOR
BY Louis Illmer
ATTORNEY June 13, 1933.   R. F. SMITH   1,914,174
FISHING LINE
Filed April 21, 1932   2 Sheets-Sheet 2
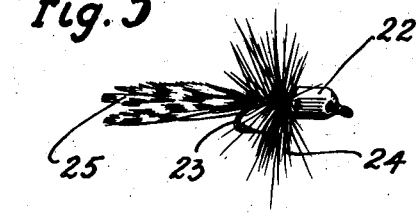
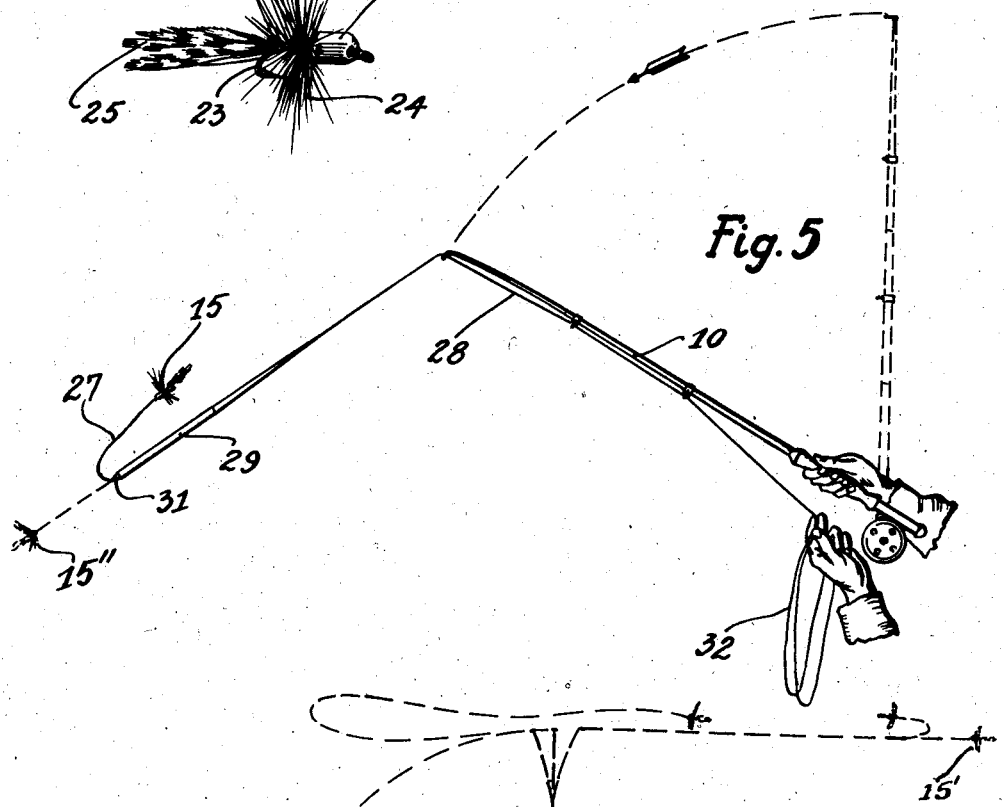
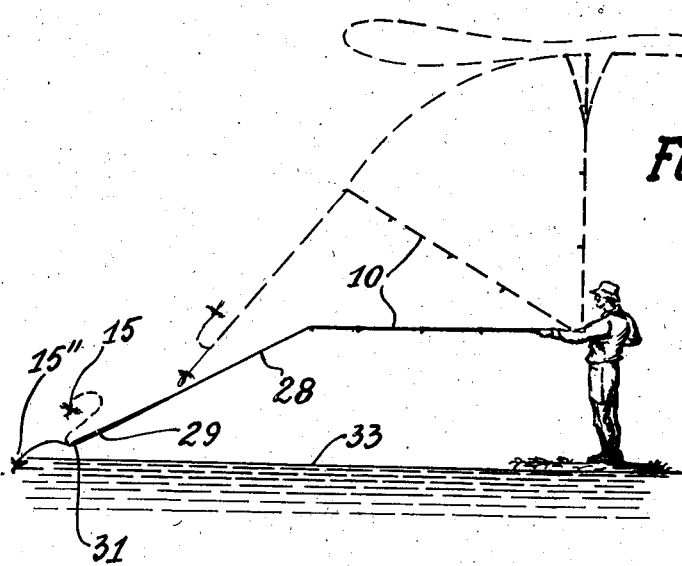
RAY F. SMITH
INVENTOR
BY Louis Illmer
ATTORNEY Patented June 13, 1933

1,914,174

UNITED STATES PATENT OFFICE

RAY F. SMITH, OF CORTLAND, NEW YORK

FISHING LINE

Application filed April 21, 1932. Serial No. 606,724.

This invention relates to a novel, one-piece fishing line and more specifically pertains to incorporated appurtenances serving to adapt the free hook or tail end portion of my line for precise casting and the unswervingly directing of certain kinds of lures, particularly an artificial, flight resistant bug such as will hereinafter be more specifically defined. My fish line may throughout its length, be continuously braided from silk or other fibrous strands having a core running therethrough, being during fabrication so constructed as to provide for a localized, bellied enlargement intermediate the ends of an otherwise uniform sized line. Such built-in weighted line portion is purposely shifted toward the tail end in a forward relation to the medial line region in order to correspondingly concentrate the center of gravity of the utilized line length toward the lure. A perfect balance is thereby effected throughout the whole of the fly-rod outfit that will accurately control the propulsion and properly carry out said bug during its casting flight. As a result, my improved line is admirably suited to surmount the considerable deviating wind resistance offered by a bulky, feather-dressed bug or the like, also one that retrieves nicely on a flexible rod and allows the course of such type of lure to be adroitly directed and gently placed upon the water with but a trifling splash.

The refinement in weight disposition as herein practiced, allows of scientifically casting an inherently light but bulky lure which must be trailed along as differentiated from a lure that possesses sufficient weight in relation to its bulk to propel itself ahead of the leading end of a cast line. To facilitate the end in view, a comparatively short line section of small diametral size is interposed between the weighted line region and its inherently high flight resistant lure.

The object of my invention is to devise a high-grade and neatly poised fishing line of the character indicated, and one that in conjunction with a suitable rod, possesses outstanding advantages over conventional appliances, all of which will presently be explicitly pointed out.

Reference is had to the accompanying two sheets of drawings which schematically represent a preferred embodiment and mode of utilizing the same, and in which drawings:

Fig. 1 shows an elevational side view of a rod equipt with my improved fishing line in which the component lengths and relative line sizes are thrown out of their true proportions for illustrative purposes.

Figs. 2 and 3 respectively represent certain different styles of bugs which my line is particularly adapted to handle.

The diagrammatic Figs. 4 to 6 respectively depict critical relationships assumed by said weighted line with reference to its rod during a casting manipulation.

Referring in detail to the drawings, the numeral 10 designates a relatively long and flexible casting rod of the conventional whipping type, preferably comprising section interlocking guides such as 11, each provided with an eye 12 through which the rod end of my fishing line may be freely threaded in the usual fashion. The lowermost end of said rod is shown provided with a reel 13 preferably of the single-action or automatic type, disposed contiguous to and beneath the rod grip 14.

The characteristic aspects of my cooperating bug-casting fishing line will now be described. As indicated in Fig. 1, the reeled end and the free tail end of this braided line are both of normal weight and diametral size in keeping with the expected catch. The surface of the entire line throughout its over-all length may be specially processed to give it a relatively hard, enamel-coated finish that provides for the desired degree of resilient flexure and allows the line to freely slip when fed through the hand in the looped fashion that is customary in bug casting.

The outermost tail end of said line is shown provided with a suitable feathered, cork-bodied bug or substantially similar lure 15 as contrasted with the far heavier and more compact style of low-resistant lure that is commonly employed for bait casting purposes. Fig. 2 details a particular style of artificial lure or so-called jumbo bass bug which my line is expressly intended to cast, and as such, preferably comprises the usual cork body 16 having a beveled head face 17 together with a leader eye 18, also a hook 19 which is partially concealed within the buck-tail portion 20 and dressed within the complementary wing feathers 21. Fig. 3 illustrates still another alternative or so-called minnow style of such bug which here comprises a suitable body 22 carrying the hook 23 having hackle 24 associated therewith and which bug is further shown as equipt with tail feathers 25. It will be obvious that the weight of both described bugs is relatively insignificant and that because of its extensive size for its given weight, a very substantial flight resistance would be encountered in attempting to cast such a bug through the air.

The eye of said bug may either be secured directly to the free end of my line or through a short, interposed gut leader (not shown). Disposed inwardly adjacent to said bug is shown an intermediary forward link section or region 27 of normal diametral line size, having a comparatively short length L1 which during the initial casting period, allows the aforesaid bug to freely assume a trailing relation with respect to the leading or impelling end of my weighted line region. The aforesaid processed finish imparts a waterproof, inherent transverse resiliency to said line section 27 and while in drenched condition, allows of briskly recovering its normal rectilinear relation after having been repeatedly flexed into a sharp return-bend shape.

As actually manufactured, my improved bug-casting line is now being marketed to the trade in a standard length of about 90 ft. and this particular embodiment will herein be used as an exemplification of the preferred proportions of such a fishing line. For the major portion of the aforesaid overall length, the reeled rod end or section 28 of this line may throughout the length L5, be kept of the same normal size and weight that is given to the forward link 27.

Between these uniformly sized sections, there is interposed the weighted belly region of my line, designated as 29 and having a length L3 which may also be kept substantially uniform in diameter but of a cross-sectional area that is stepped up and materially enlarged over that of said normal sized line. This relatively heavy sectional region is bodily shifted and purposely concentrated closely behind the bug 15 so as to effectively act in the capacity of a propelling medium therefor when the line is cast. In practice, I have found it expedient to extend the sectional length L3 for perhaps fifteen feet or more depending upon the heft of line used, and it will be observed that the opposite ends thereof are preferably tapered inwardly toward their respective adjacent smaller sized lines.

The rod end taper section 30 is shown gradually reduced in diameter in the relatively long length L4 to allow said taper to pass freely through the various guide eyes of the rod, while the opposite end or nose taper section 31 is abruptly reduced in size in order to throw the sought-for weight effect as near to the bug as is feasible.

Having described the structural features of my fishing line, a brief exposition of its improved mode of operation will serve to stress its inherent advantages over the conventional style of lure-casting lines. To this end reference is now made to Figs. 4, 5 and 6. For the distant casting of the described bug 15, the major portion of my weighted line section 29 is initially run out through the outermost guide eye of the rod as shown. The line having been previously stripped off the reel with one hand to provide for a plurality of coiled loops such as 32 and the grip 14 being held in the other hand in the slightly lifted position approximately indicated in dotted outline by Fig. 4, the angler is now prepared to initiate a cast by rapidly raising the rod into a substantially vertical position. This movement in turn impels the weighted belly section of my fish line into a rearward, horizontal direction with the bug 15 trailing the nose end 31 thereof into somewhat like its indicated full-lined position of Fig. 4. During such back cast stroke, the propelled section 29 continues onward until the fish line becomes fairly taut with respect to the flexible rod end, and thereupon said bug is made ready instantly to spring or whip ahead into its extended position 15'.

The rod may now be thrust ahead into the full-lined position shown in Fig. 5, which as a consequence casts the line forward as illustrated with the bug again trailing the nose end of the weighted line section 29; after having taken up the line slack, said bug will now be whipped into its extreme outermost position 15''. During such false cast, certain of said loops may be released and fed out into the swaying line portion so as to extend its effective length while keeping the bug in suspended flight. By successive similar operations, additional distance may be gained and the line made ready for the final forward cast. This latter step is graphically represented in Fig. 6 where the nose 31 of the impelled weighted line section has been lodged somewhat above the water level 33 and has again carried the bug 15 forward in a still trailing relation thereto, but which bug is at this critical instant yanked onward by the angler and gently dropped upon the water while said nose momentarily remains suspended in the air.

This briefly illustrated explanation will make evident to those skilled in this art, the important fuction and need of the described intermediate section 27. Being kept relatively light, this forwardly disposed line link readily accommodates itself to the drag that is exerted by a feathered bug during its forward cast and at the same time obviates the undesirable splash that might otherwise accompany the use of a heavier line section extended out for direct attachment to the hook. It will be observed that my invention centers in a novel combination of interconnected sectional line regions so disposed as to provide for a delicately balanced tail end while at the same time concentrating the necessary line propelling weight immediately behind said forward link, all of which allows of expertly casting a long line and of accurately carrying the described bug toward its distant objective. This aspect assumes especial significance in the proper casting of a high resistant lure of the type depicted in Fig. 2, which because of its low weight in proportion to its bulk, is unable to propel itself ahead of the weighted line region but is herein dragged along through the flexed link section 27. The line nose 31 is so disposed in relation to the trailing lure, that it virtually constitutes a nodal point about which said link section starts to flex while in flight.

Finally, it is emphasized that the nature of the problem herein solved is one quite different and in the light of the present disclosure, readily distinguishable from the well-known bait casting type of line, which latter generally resorts to the use of a relatively compact, low-resistant lure of the self-propelling type which when cast, causes its weight to be thrown ahead of the leading line end and hence tends to drag along and direct the attached trailing fish line toward its goal. I am also aware that there has long been in use the conventional double-tapered fly line having a weighted belly portion confined to the medial region of the over-all length thereof. This latter type however is incapable of properly casting the herein described bug having an inherently high flight resistance in proportion to its weight, or of attaining the same nicety of control and degree of accuracy that is afforded for this purpose by my construction in which the center of gravity is shifted well forwardly to dominate the tail end of the line and thereby surmount the deviating effects of a cross-wind. Such improved weight disposition possesses a further advantage in that it is made equally effective even when but a minor portion of the whole line is unreeled and brought into active service.

It is believed that the foregoing specification when read in connection with the accompanying drawings make apparent the intended construction, mode of operation and advantages of my improvements, it being understood that the more outstanding features are subject to considerable latitude in practical application, also that various modifications may be resorted to, all without departing from the spirit and scope of my invention as defined in the appended claims.

I claim:

1. A continuous fishing line adapted for lure casting purposes of which one end portion is reeled and a free unreeled portion is hurled forwardly by means of a cooperating flexible rod, in combination with an artificial lure of the flight resistant type and a cooperatively weighted line, said line comprising a plurality of interconnected sectional regions having their respective outermost regions substantially alike in diametral size and kept commensurate with the expected catch and which sections include a tapered intermediate line region whose leading end is radially enlarged and weighted with respect to the aforesaid diametral size and serves for lure propulsion purposes, said weighted region being wholly confined within the leading half of the over-all line length.

2. The combination of a continuous fishing line for casting purposes and a cooperating lure of the flight resistant, bug type attached to the leading line end and which line comprises a plurality of interconnected sectional regions of which the respective outermost regions are each given a certain substantially uniform diametral size while an intermediate sectional line region is relatively weighted by materially enlarging the diameter thereof beyond either of the aforesaid certain sizes to facilitate balanced propulsion and control the flight of the cast lure, the trailing end of said weighted line region being gradually tapered toward its contiguous smaller sized region and the leading end of said weighted region being oppositely tapered toward its contiguous smaller sized region with a comparatively abrupt conic convergence to constitute a nose formation, the differential tapers being disposed to shift the center of gravity of the aforesaid weighted line region forward of its mid-sectional length and toward said lure.

3. A continuously braided fishing line adapted to be cast from the end of a flexible rod toward an objective, in combination with an artificial lure of the bug type including a feathered hook-carrying body whose flight resistance is relatively high in proportion to its weight, a waterproofed, inherently resilient link-like line region of which one end is operatively associated with said lure and which region is of substantially uniform diametral size commensurate with the expected catch, a weighted line region following the trailing end of said link-like region and which weighted region is materially enlarged diametrically with respect to said uniform line size, and a tapered sectional region extending onward from the trailing end of the weighted region to terminate in a reduced diameter substantially equal to that given the smaller uniform line size, all of the aforesaid line regions being disposed within a minor portion of the over-all length of said fishing line.

4. A continuous fishing line processed with waterproof coating to impart inherent resiliency thereto and adapted to be cast forwardly from the end of a flexible rod toward an objective, in combination with a weighted line region disposed wholly within the confines of the forward half of the over-all line length and having a conically shaped nose abruptly reducing the diametral size of the leading end of said region, a relatively short, resilient link-like line region extending forwardly from the aforesaid reduced diametral size and ahead of said nose, and an artificial lure associated with the leading end of said link-like region and which line upon being cast, causes the nose during its forward flight to laterally flex said link region into a return-bend contour and therethrough drag along said lure in a trailing relationship to said nose.

5. A continuous fishing line processed with waterproof coating to impart inherent resiliency thereto and adapted to be cast forwardly from the end of a flexible rod toward an objective, in combination with an enlarged bellied line region interposed between the respective over-all line ends serving to concentrate weight for line propulsion purposes and which bellied region is bodily shifted ahead and confined within the forward half of the over-all line length but kept spaced from the outermost free line end thereof to constitute a relatively short, resilient link region, and an artificial lure of the bug type associated with the leading end of said link region and which lure while initiating a line cast, is dragged into a longitudinally trailing relation with respect to the leading end of said bellied region through the laterally flexed link region, said lure being impelled forwardly by the flexed link region during a subsequent period of the cast.

6. A one-piece fishing line adapted for lure casting purposes and which line is manipulatively hurled from a flexible rod, in combination with a lure of the inherently high flight resistant type, and a cooperatively weighted line comprising a plurality of interbraided sections of different diametral sizes and of which the leading hurled section is of comparative short length and kept smaller in size for attachment to said lure and of which line a trailing larger sized section serves as the primary propelling medium for said lure acting through the aforesaid leading section, said lure when cast being dragged rearwardly behind the leading end of said trailing section.

7. A one-piece fishing line adapted for lure casting purposes and which line is manipulatively hurled from a flexible rod, in combination with a lure of the inherently high flight resistant type, and a cooperatively weighted line comprising a plurality of interbraided sections of different diametral sizes of which an outermost section is attached to the lure and a larger sized intermediate section serves to initially drag said lure into a trailing relation to the leading end of said larger section and which line upon becoming taut, causes said trailing lure to be whipped ahead of the leading end of the intermediate section.

In testimony whereof, I have herewith set my hand this 19th day of April, 1932.

RAY F. SMITH.